(12) United States Patent
Nakao

(10) Patent No.: US 8,976,732 B2
(45) Date of Patent: *Mar. 10, 2015

(54) RADIO APPARATUS

(71) Applicant: Sanyo Electric Co., Ltd., Moriguchi-shi (JP)

(72) Inventor: Seigo Nakao, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 1 day.

This patent is subject to a terminal disclaimer.

(21) Appl. No.: 13/745,085

(22) Filed: Jan. 18, 2013

(65) Prior Publication Data

US 2013/0128818 A1 May 23, 2013

Related U.S. Application Data

(63) Continuation of application No. 13/004,571, filed on Jan. 11, 2011, now Pat. No. 8,380,141, which is a continuation of application No. 11/521,488, filed on Sep. 15, 2006, now Pat. No. 7,899,413.

(60) Provisional application No. 60/716,926, filed on Sep. 15, 2005.

(51) Int. Cl.
*H04W 4/00* (2009.01)
*H04B 7/216* (2006.01)
(Continued)

(52) U.S. Cl.
CPC ............ *H04B 7/0413* (2013.01); *H04B 7/0667* (2013.01); *H04L 5/0023* (2013.01);
(Continued)

(58) Field of Classification Search
CPC .. H04B 7/0413; H04B 7/0673; H04B 7/0894; H04B 1/0009; H04B 5/0025; H04B 5/0048; H04B 7/041; H04B 25/0204; H04B 27/2613; H04B 27/2662

USPC ............. 455/101, 103, 104, 132, 450, 553.1; 375/137, 145, 149, 267, 335, 347; 370/334, 342, 345, 328, 329–330
See application file for complete search history.

(56) References Cited

U.S. PATENT DOCUMENTS 6,473,467 B1   10/2002   Wallace et al.
6,600,933 B1   7/2003    Hiramatsu et al.
(Continued)

FOREIGN PATENT DOCUMENTS

JP    2005-210690 A    8/2005
TW    508922 B          11/2002
(Continued)

OTHER PUBLICATIONS

The office action issued on Nov. 7, 2011 in the related U.S. Appl. No. 12/323,757.
(Continued)

*Primary Examiner* — Simon Nguyen
(74) *Attorney, Agent, or Firm* — DC Patent Lawyers, PLLC

(57) ABSTRACT

A control unit, in cooperation with an interface (IF) unit, a modulation unit and a baseband processing unit, produces a packet signal composed of a plurality of streams. While using as a reference a first known signal assigned to one of the plurality of streams and performing a cyclic timing shift within the first known signal on a first known signal assigned to another stream, the control unit performs a timing shift also on an extensional known signal assigned to a stream where no data is assigned. The amounts of timing shift are given degrees of priority beforehand and for the stream where data signals are assigned the control unit uses the amounts of timing shift in descending degree of priority. For the stream where no data signal is assigned, the control unit uses the amounts of timing shift also in descending degree of priority.

5 Claims, 11 Drawing Sheets

(51) Int. Cl.
*H04J 3/00* (2006.01)
*H04B 7/08* (2006.01)
*H04W 72/00* (2009.01)
*H04B 7/04* (2006.01)
*H04B 7/06* (2006.01)
*H04L 5/00* (2006.01)
*H04L 27/26* (2006.01)
*H04L 1/00* (2006.01)
*H04L 25/02* (2006.01)

(52) U.S. Cl.
CPC ............ *H04L5/0048* (2013.01); *H04L 5/0064* (2013.01); *H04L 27/2613* (2013.01); *H04L 1/0003* (2013.01); *H04L 1/0009* (2013.01); *H04L 25/0204* (2013.01); *H04L 25/0226* (2013.01); *H04L 27/2662* (2013.01)
USPC ........... 370/328; 370/330; 370/342; 370/345; 455/104; 455/132; 455/450

(56) References Cited

U.S. PATENT DOCUMENTS

| | | | |
|---|---|---|---|
| 6,751,187 | B2 | 6/2004 | Walton et al. |
| 6,931,238 | B1* | 8/2005 | Aizawa et al. ............... 455/101 |
| 7,586,881 | B2* | 9/2009 | Hansen et al. ............... 370/334 |
| 7,738,356 | B2* | 6/2010 | Kim ............................. 370/208 |
| 8,380,141 | B2* | 2/2013 | Nakao .......................... 455/91 |
| 2003/0043732 | A1 | 3/2003 | Walton et al. |
| 2003/0137989 | A1* | 7/2003 | Nagai ........................... 370/455 |
| 2004/0192216 | A1 | 9/2004 | Marzetta et al. |
| 2005/0041751 | A1 | 2/2005 | Nir et al. |
| 2005/0084030 | A1 | 4/2005 | Zhou et al. |
| 2005/0201270 | A1* | 9/2005 | Song et al. .................... 370/208 |
| 2005/0219999 | A1 | 10/2005 | Kim et al. |
| 2005/0259567 | A1* | 11/2005 | Webster et al. ............... 370/208 |
| 2006/0013186 | A1* | 1/2006 | Agrawal et al. .............. 370/344 |
| 2006/0068698 | A1* | 3/2006 | Sandhu et al. ................ 455/1 |
| 2006/0227891 | A1* | 10/2006 | Niu et al. ..................... 375/267 |
| 2006/0268165 | A1* | 11/2006 | van Nee ....................... 348/388.1 |
| 2008/0039107 | A1* | 2/2008 | Ma et al. ...................... 455/450 |
| 2008/0273494 | A1* | 11/2008 | Vook et al. ................... 370/330 |

FOREIGN PATENT DOCUMENTS

| | | |
|---|---|---|
| TW | I223516 B | 11/2004 |
| WO | 02/099995 A2 | 12/2002 |
| WO | 2004/017586 A1 | 2/2004 |
| WO | 2004/019515 A1 | 3/2004 |
| WO | 2005/006699 A1 | 1/2005 |
| WO | 02/099995 A2 | 12/2012 |

OTHER PUBLICATIONS

The Taiwan examination report issued on Mar. 18, 2013, in a counterpart Taiwan patent application.
The European search report issued on Jan. 25, 2013, in a counterpart European patent application.
The US office action issued on Jan. 3, 2013, in a related US patent application.
The European search report issued on Jul. 6, 2012, in a counterpart European patent application.
The US office action issued on Aug. 27, 2012, in a related US patent application.
The European search report issued on May 3, 2012, in a counterpart European patent application.
The US office action issued on Mar. 20, 2012, in a related US patent application.
The US office action issued on Nov. 8, 2011, in a related US patent application.
The Taiwan examination report issued on Dec. 22, 2011, in a counterpart Taiwan patent application.
The office action issued on Jan. 31, 2012 in the related Japanese patent application.
The Japanese office action issued on May 28, 2013, in a counterpart Japanese patent application.
Office action letter issued on Nov. 5, 2014, in the counterpart European patent application.

* cited by examiner

FIG.3A

| L-STF | L-LTF | L-SIG | HT-SIG | HT-STF | HT-LTF | HT-LTF | HT-LTF | HT-LTF | DATA 1 |
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | HT-LTF -200ns | HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | HT-LTF -600ns | HT-LTF -600ns | DATA 4 -600ns |

FIG.3B

| L-STF | L-LTF | L-SIG | HT-SIG | HT-STF | HT-LTF | HT-LTF | DATA 1 |
| L-STF -50ns | L-LTF -50ns | L-SIG -50ns | HT-SIG -50ns | HT-STF -400ns | HT-LTF -400ns | HT-LTF -400ns | DATA 2 -400ns |

FIG.4A

| L-STF | L-LTF | L-SIG | HT-SIG | HT-STF | HT-LTF | HT-LTF |
| L-STF -50ns | L-LTF -50ns | L-SIG -50ns | HT-SIG -50ns | HT-STF -400ns | HT-LTF -400ns | -HT-LTF -400ns |

| HT-LTF | HT-LTF |
| HT-LTF -400ns | -HT-LTF -400ns |

| DATA 1 |
| DATA 2 -400ns |

FIG.4B

| L-STF | L-LTF | L-SIG | HT-SIG | HT-STF | HT-LTF |

| HT-LTF | -HT-LTF | HT-LTF |
| HT-LTF -400ns | -HT-LTF -400ns | HT-LTF -400ns |
| HT-LTF -200ns | -HT-LTF -200ns | HT-LTF -200ns |

| DATA 1 |

FIG.4C

| L-STF | L-LTF | L-SIG | HT-SIG | HT-STF | HT-LTF |

| HT-LTF | -HT-LTF | HT-LTF | -HT-LTF |
| HT-LTF -400ns | -HT-LTF -400ns | HT-LTF -400ns | -HT-LTF -400ns |
| HT-LTF -200ns | -HT-LTF -200ns | HT-LTF -200ns | -HT-LTF -200ns |

| DATA 1 |

FIG. 5

| L-STF | L-LTF | L-SIG | HT-SIG | HT-STF1 | HT-LTF1 | HT-LTF5 | HT-LTF9 | HT-LTF13 | DATA 3 |
| L-STF -50ns | L-LTF -50ns | L-SIG -50ns | HT-SIG -50ns | HT-STF2 -50ns | HT-LTF2 -50ns | HT-LTF6 -50ns | HT-LTF10 -50ns | HT-LTF14 -50ns | DATA 4 -50ns |
| L-STF -100ns | L-LTF -100ns | L-SIG -100ns | HT-SIG -100ns | HT-STF3 -100ns | HT-LTF3 -100ns | HT-LTF7 -100ns | HT-LTF11 -100ns | HT-LTF15 -100ns | DATA 5 -100ns |
| L-STF -150ns | L-LTF -150ns | L-SIG -150ns | HT-SIG -150ns | HT-STF4 -150ns | HT-LTF4 -150ns | HT-LTF8 -150ns | HT-LTF12 -150ns | HT-LTF16 -150ns | DATA 6 -150ns |

RADIO APPARATUS

This application is a Continuation application of a Divisional application Ser. No. 13/004,571, filed on Jan. 11, 2011, which is based upon an application Ser. No. 11/521,488, filed on Sep. 15, 2006, which claims the benefit of U.S. Provisional Application No. 60/716,926, filed on Sep. 15, 2005; the entire contents of which are incorporated herein by reference.

BACKGROUND OF THE INVENTION

1. Field of the Invention

The present invention relates to radio apparatus, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless LAN (Local Area Network) standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the packet signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and packet signals to be transmitted in parallel are set (hereinafter, each of data to be transmitted in parallel in a packet signal is called "stream"). That is, streams up to the maximum number of antennas are set for the communications between the transmitting apparatus and the receiving apparatus so as to improve the data transmission rates.

Moreover, combining this MIMO system with the OFDM modulation scheme results in a higher data transmission rate. In the MIMO system, the data rate can also be adjusted by increasing or decreasing the number of antennas to be used for data communications. Furthermore, the data rate can be adjusted in greater detail by applying the adaptive modulation to the MIMO system. To perform such an adjustment of data rates more reliably, the transmitting apparatus should acquire from the receiving apparatus the information on data rates suited for the radio channel between the transmitting apparatus and the receiving apparatus (hereinafter referred to as "rate information"). To raise the accuracy of the rate information like this, it is desired that the channel characteristics between a plurality of antennas in the transmitting apparatus and a plurality of antennas contained in the receiving apparatus, respectively, be acquired by the receiving apparatus.

Examples of the combinations of directivity patterns in the antennas of the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. This is also called the beamforming. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, it is necessary to receive beforehand from the receiving apparatus the known signals by which to estimate channels.

To improve the accuracy of rate information and the accuracy of beamforming in the above-mentioned requirements, it is necessary that the channel characteristics be acquired with high accuracy. To improve the accuracy in the acquisition of channel characteristics, it is desirable that the channel characteristics between a plurality of antennas contained in the transmitting apparatus and those in the receiving apparatus be acquired respectively. For this reason, the transmitting apparatus or the receiving apparatus transmits from all of antennas the known signals for use in channel estimation. Hereinafter, the known signals, for use in channel estimation, transmitted from a plurality of antennas will be referred to as "training signals" independently of the number of antennas to be used for data communication.

Under these circumstances, the inventor of the present invention came to recognize the following problems to be solved. When the training signals are transmitted, the number of streams containing known signals for use in channel estimation (hereinafter referred to as "channel estimation known signals") differs from that containing data. A known signal for setting AGC (Automatic Gain Control), hereinafter referred to as "AGC known signal", at the receiving side is assigned anterior to the channel estimation known signals. When an AGC known signal is assigned only in a stream where data is assigned, one of the channel estimation known signals is received in a state where the AGC known signal has not been received anterior thereto. In particular, when the strength of AGC known signal gets smaller at the receiving side, the gain of AGC is set to a value which is large to a certain degree. In so doing, when the strength of channel estimation known signal of a stream where the AGC known signal is not assigned is larger, there is a strong possibility that said channel estimation known signal may be amplified to such a degree that distortion is caused by AGC. As a result thereof, the error in channel estimation based on said channel estimation known signal becomes large.

On the other hand, when an AGC known signal is assigned to a stream where a channel estimation known signal is assigned, the number of streams to which the AGC known signal is assigned differs from that to which data is assigned. Hence, there is a possibility that the gain set by the AGC known signal is not suitable for the modulation of data. As a result, the demodulated data are subject to errors.

SUMMARY OF THE INVENTION

The present invention has been made under such circumstances and a general purpose thereof is to provide a radio apparatus that prevents the degradation in receiving characteristics at the time of transmitting known signals for use in channel estimation.

In order to solve the above problems, a radio apparatus according to one embodiment of the present invention is a radio apparatus for transmitting a packet signal composed of a plurality of streams, and the apparatus comprises: a generation unit which generates the packet signal in a manner that a data signal is assigned to at least one of the plurality of streams, a known signal is assigned anterior to a data signal in a stream to which said data signal is assigned, and an extensional known signal is assigned to a timing other than timings at which a known signal is assigned and a data signal is assigned, for a stream in which said data signal is not assigned; and a transmitter which transmits the packet signal generated by the generation unit. Using as a reference a known signal assigned to one of streams where a data signal is assigned, the generation unit applies a cyclic timing shift within a known signal to a known signal assigned to the other streams and applies a timing shift also to an extensional known signal assigned to a stream where data is not assigned; and an amount of timing shift is given beforehand a degree of priority, and the amount of timing shift is used sequentially in order from one with the highest degree of priority for the stream where a data signal is assigned, whereas the amount of timing shift is used sequentially in order from one with the highest degree of priority for the stream where a data signal is not assigned.

According to this embodiment, the timing of a known signal assigned to a stream to which a data signal is assigned is staggered in relation to the timing of a known signal assigned to a stream to which no data signal is assigned so as to get the received powers of both the streams closer to each other. As a result, it is possible to prevent any worsening of accuracy in the receiving.

The known signal and the extensional known signal are formed by repeating a predetermined unit in time domain, and a combination of signs in a predetermined unit may be defined in a manner such that an orthogonal relationship holds among streams and the combination of signs in a predetermined unit is fixed for each of a plurality of streams. In such a case, the combination of signs is fixed, so that the processing can be made simpler.

The known signal and the extensional known signal are formed by repeating a predetermined unit in time domain, a combination of signs in a predetermined unit may be defined in a manner such that an orthogonal relationship holds among streams and the combination of signs in a predetermined unit may be given beforehand a degree of priority, and the combination of signs may be used sequentially in order from one with the highest degree of priority for the stream where a data signal is assigned, whereas the combination of signs may be used sequentially in order from one with the highest degree of priority for the stream where a data signal is not assigned. In such a case, the combinations of signs are used sequentially in order from the combination of signs having the highest degree of priority, so that a common circuit can be used in both of the calculation of channel characteristics for a stream to which data is not assigned and the calculation of channel characteristics for a streams to which data is assigned.

Another embodiment of the present invention relates also to a radio apparatus. This apparatus is a radio apparatus for transmitting a packet signal composed of a plurality of streams, and the apparatus comprises: a generation unit which generates the packet signal in a manner that a data signal is assigned to at least one of the plurality of streams, a known signal is assigned anterior to a data signal in a stream to which said data signal is assigned, and an extensional known signal is assigned to a timing other than timings at which a known signal is assigned and a data signal is assigned, for a stream in which said data signal is not assigned; and a transmitter which transmits the packet signal generated by the generation unit. Using as a reference a known signal assigned to one of streams where a data signal is assigned, the generation unit applies a cyclic timing shift within a known signal to a known signal assigned to the other streams and applies a timing shift also to an extensional known signal assigned to a stream where data is not assigned, and a different value of timing shift amount is set to each of the plurality of streams.

According to this embodiment, the timing of a known signal assigned to a stream to which a data signal is assigned is shifted from the timing of a known signal assigned to a stream to which no data signal is assigned. As a result thereof, the received powers of both the streams can be brought closer to each other and therefore any worsening of accuracy in the receiving can be prevented.

The known signal and the extensional known signal are formed by repeating a predetermined unit in time domain, a combination of signs in a predetermined unit may be defined in a manner such that an orthogonal relationship holds among streams and the combination of signs in a predetermined unit may be given beforehand a degree of priority, and the combination of signs may be used sequentially in order from one with the highest degree of priority for the stream where a data signal is assigned, whereas the combination of signs may be used sequentially in order from one with the highest degree of priority for the stream where a data signal is not assigned. In such a case, the combinations of signs are used sequentially in order from the combination of signs having the highest degree of priority, so that a common circuit can be used in both of the calculation of channel characteristics for a stream to which data is not assigned and the calculation of channel characteristics for a streams to which data is assigned.

The generation unit applies the cyclic timing shift to a data signal and an amount of timing shift for the stream where a data signal is assigned is used as the amount of timing shift. In this case, the data signals can be demodulated.

Any of the radio apparatuses described above may further comprise a modification unit which outputs a modified signal to the transmitter. The modification unit may include: a first processing unit which extends the number of streams, where data signals are assigned, up to the number of a plurality of streams and then, for the extended stream, applies a cyclic timing shift within a known signal to a known signal assigned to the other streams using as a reference a known signal assigned to one of the extended streams; and a second processing unit which extends the number of streams, where no data signal is assigned, up to the number of a plurality of streams and then, for the extended streams, applies a cyclic timing shift within an extensional known signal to an extensional known signal assigned to the other streams using as a reference an extensional known signal assigned to one of the extended streams. The amount of timing shift may be set in a manner that the respective values of timing shift amounts used for the extended streams in the first processing unit are respectively equal to those for the extended streams in the second processing unit.

An absolute value of the timing shift amount in the generation unit may be so set as to be greater than that in the modification unit.

Data may be composed of a plurality of streams. A known signal may be composed of a plurality of streams. A control signal may be composed of a plurality of streams.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B illustrate packet formats in a communication system shown in FIG. 2;

FIGS. 4A to 4C illustrate packet formats for training signals in a communication system shown in FIG. 2;

FIG. 5 illustrates a packet format of packet signals to be finally transmitted in a communication system shown in FIG. 2;

DETAILED DESCRIPTION OF THE INVENTION

Figure 1:
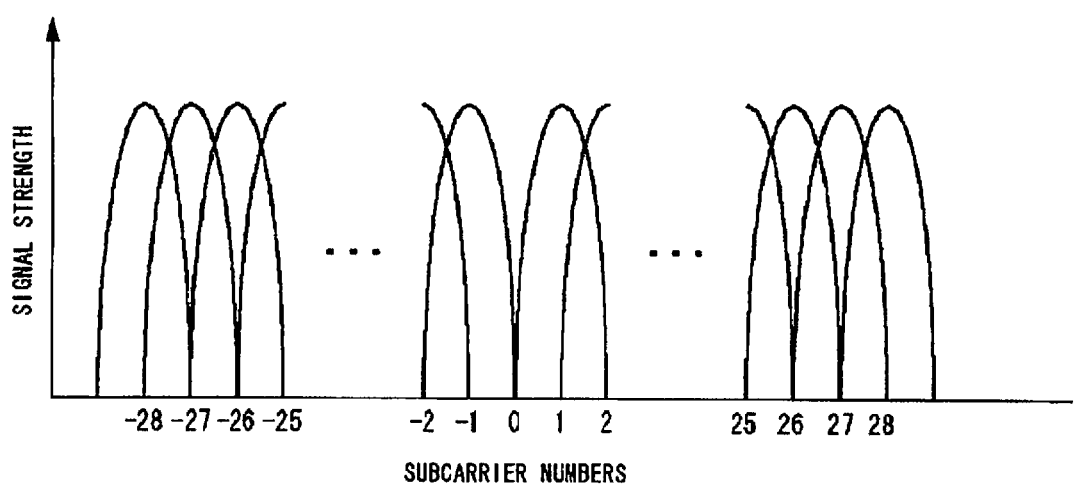
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a specific description thereof. Embodiments of the present invention relate to a MIMO system comprised of at least two radio apparatuses. One of the radio apparatuses corresponds to a transmitting apparatus whereas the other thereof corresponds to a receiving apparatus. The transmitting apparatus generates one packet signal composed of a plurality of streams. In particular, a description will be given here of a processing performed when the transmitting apparatus transmits training signals. Any known technique may be used for the adaptive modulation processing using the aforementioned rate information and the beamforming and therefore the repeated explanation will be omitted here. As described earlier, if the number of streams to which the AGC known signal is assigned differs from that to which the channel estimation known signal is assigned, there is a possibility that the error in estimation of channel characteristics in the receiving apparatus will deteriorate. For these reasons, the following processing will be carried out in the present embodiment.

The transmitting apparatus divides a known signal for channel estimation into a part of a stream where a data signal is assigned and a part thereof where a data signal is not assigned. Here, the part of the known signal for channel estimation corresponding to the stream where a data signal is assigned is called a first known signal, and the part thereof corresponding to the stream where a data signal is not assigned a second known signal. The transmitting apparatus assigns the first known signal to a position posterior to an AGC known signal and the second known signal to a position posterior to the first known signal. Further, the transmitting apparatus assigns a data signal to a position posterior to the second known signal. In other words, for a stream where a data signal is assigned, the transmitting apparatus places a blank duration in a position posterior to the known signal for AGC and first known signal and assigns a data signal to a position posterior to the blank duration. The blank duration here corresponds to the duration where the second known signal is assigned in a stream where a data signal is not assigned.

To improve the receiving characteristics, it is desirable that the correlation among the AGC known signals to be assigned to a plurality of streams and the correlation among the channel estimation known signals to be assigned to a plurality of streams be small, respectively (Hereinbelow, "known signals for AGC (AGC known signals)" and "known signals for channel estimation (channel estimation known signals)" will also be referred to collectively as "known signals".). In this regard, cyclic timing shifting is carried out among known signals. Such a processing is generally called CDD (Cyclic Delay Diversity). In the present embodiments, the amount of timing shift is defined according to the number of a plurality of streams, and further such amounts of timing shift are given their respective degrees of priority. The transmitting apparatus uses the first known signals in order from the timing shift amount given the highest degree of priority and also uses the second known signals in order from the timing shift amount given the highest degree of priority. That is, the amounts of timing shift with the same values are used more frequently, thus making the processing simpler.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system which is not compatible with a MIMO system (hereinafter referred to as a "legacy system"). One example of legacy systems is a wireless LAN complying with the IEEE802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" as described earlier. As a result thereof, since the mode of modulation scheme and the values of coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
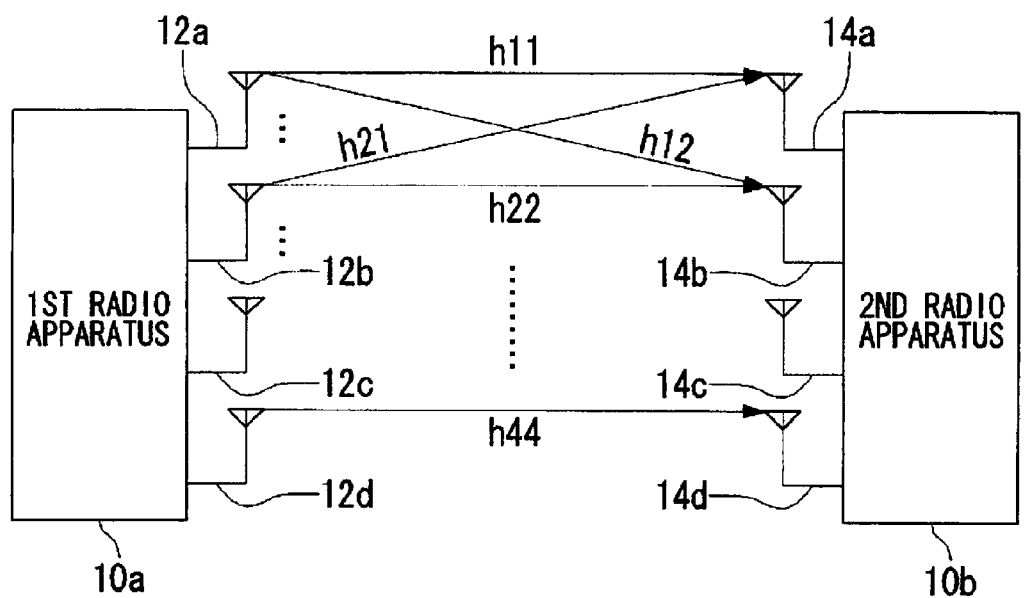
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be described as a structure of the communication system 100. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals by adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. Note that the roles of the first radio apparatus 10a and the second radio apparatus 10b may be reversed. It is assumed here that the training signals are transmitted from the first radio apparatus 10a to the second radio apparatus 10b.

FIGS. 3A and 3B show packet formats for a communication system 100. The packet formats shown in FIGS. 3A and 3B are not the formats of training signals but those of ordinary packet signals. FIG. 3A represents a case where the number of streams is "4", and FIG. 3B a case where the number of streams is "2". In FIG. 3A, it is assumed that data contained in four streams are to be transmitted, and packet formats corresponding to the first to fourth streams are shown in order from top row to bottom row. In the packet signal corresponding to the first stream, "L-STF", "HT-LTF" and the like are assigned as preamble signals. "L-STF", "L-LTF", "L-SIG", and "HT-SIG" are a known signal for AGC setting, a known signal for channel estimation and a control signal compatible with a legacy system, and a control signal compatible with a MIMO system, respectively. The control signal compatible with a MIMO system, for example, has information on the number of streams included therein. "HT-STF" and "HT-LTF" are a known signal for AGC setting and a known signal, for channel estimation, compatible with a MIMO system, respectively. On the other hand, "DATA 1" is a data signal. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. And, in the packet signal corresponding to the third stream, "L-STF(−100 ns)", "HT-LTF(−200 ns)" and the like are assigned as preamble signals. And, in the packet signal corresponding to the fourth stream, "L-STF(−150 ns)", "HT-LTF(−600 ns)" and the like are assigned as preamble signals. Here, "−400 ns" and the like indicate the amounts of timing shift in CDD. The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. Hence, "L-STF(−50 ns)" is "L-STF" given a cyclic timing shift by a delay of −50 ns. Note that L-STF and HT-STF are each structured by a repetition of an 800 ns duration and that the other parts such as HT-LTF and the like are each constituted by a repetition of a 3.2 µs duration. It is also to be noted that "DATA 1" to "DATA 4" are also subjected to CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+fourth component" for received signals of all the streams. The receiving apparatus extracts a desired signal for the fourth stream by computing "first component+second component−third component−fourth component" for received signals of all the streams. Note that the addition and subtraction processing is done by vector operation.

As with a legacy system, "52" subcarriers are used for the part from "L-LTF" to "HT-SIG1" and so forth. Note that "4" subcarriers out of the "52" subcarriers correspond to pilot signals. On the other hand, the part of "HT-LTF" or the like and thereafter uses "56" subcarriers.

FIG. 3B is similar to the first stream and second stream of the packet formats shown in FIG. 3A. Here, the assignment of "HT-LTFs" in FIG. 3B differs from that of "HT-LTFs" in FIG. 3A. That is, there are only the first components and the second components of HT-LTFs. In the first stream, HT-LTFs are assigned in the order of "HT-LTF" and "HT-LTF" from the top. A receiving apparatus extracts a desired signal for the first stream by computing "first component+second component" for received signals of all the streams. Also, the receiving apparatus extracts a desired signal for the second stream by computing "first component−second component" for received signals of all the streams.

FIGS. 4A to 4C show packet formats of training signals for a communication system 100. FIG. 4A represents a case where the number of streams to which a data signal is assigned is "2", and FIGS. 4B and 4C a case where the number of streams to which a data signal is assigned is "1". That is, a data signal is assigned to each of the first stream and the second stream in FIG. 4A, whereas a data signal is assigned to the first stream in FIGS. 4B and 4C. The assignment up to HT-LTF in the first stream and the second stream in FIG. 4A is the same as that of FIG. 3B. In a position posterior thereto, however, a blank duration is provided in the first stream and the second stream. In the third and fourth streams, on the other hand, HT-LTFs are assigned to the position corresponding to the blank duration in the first and second streams. And, following the HT-LTFs assigned in the third and fourth streams, data are assigned to the first and second streams.

The assignment as described above makes the number of streams to which "HT-STF" is assigned equal to the number of streams to which a data signal is assigned, so that the error contained in the gain set by "HT-STF" becomes small at a receiving apparatus, thus preventing the worsening of data signal receiving characteristics. Also, since the "HT-LTFs" assigned to the third and fourth streams are only assigned to these two streams, the error contained in the gain set by "HT-STF" becomes small at a receiving apparatus, thus preventing a drop in the accuracy of channel estimation.

Here it is assumed that the degrees of priority for the amounts of timing shift are defined in the descending order of "0 ns", "−400 ns", "−200 ns" and "−600 ns". In other words, "0 ns" has the highest degree of priority, and "−600 ns" the lowest. Accordingly, the values of "0 ns" and "−400 ns" are used as timing shift amounts in the first stream and the second stream, respectively. In the third stream and the fourth stream, the values of "0 ns" and "−400 ns" are also used as timing shift amounts, respectively. As a result, the combination of "HT-LTF" and "HT-LTF" in the first stream is also used in the third stream, and the combination of "HT-LTF(−400 ns)" and "−HT-LTF(−400 ns)" in the second stream is also used in the fourth stream, thus making the processing simpler.

The assignment up to HT-LTF in the first stream in FIG. 4B is the same as that of the first stream in FIG. 3B. Here "HT-LTF" is assigned to one position only. In a position posterior thereto, however, a blank duration is provided in the first stream. In the second to fourth streams, on the other hand, HT-LTFs are assigned to the positions corresponding to the blank duration in the first stream. And, following the HT-LTFs assigned in the second to fourth streams, data is assigned to the first stream. The packet format of FIG. 4C is structured the same way as for those of FIG. 4B. However, the combination of the signs of "HT-LTF" in FIG. 4C differs from that in FIG. 4B. Here, combination of the signs of "HT-LTF" is so defined that an orthogonal relationship holds among the streams. Furthermore, in FIG. 4C, the combination of the signs of "HT-LTF" is so defined as to be fixed for each of a plurality of streams.

The HT-LTFs assigned to the second to fourth streams are the same as those assigned to the first to third streams in FIG. 3A. That is, "0 ns", "−400 ns" and "−200 ns", which have higher degrees of priority, are used even in the second to fourth streams.

FIG. 5 shows packet formats of a packet signal that is finally transmitted in the communication system 100. FIG. 5 corresponds to a modified version of a packet signal of FIG. 4A. The assignment up to "HT-SIG" in FIG. 5 is the same as that in FIG. 3A. An operation by orthogonal matrix to be explained later is carried out before "HT-STF" and "HT-LTF", which are assigned to the first and second streams of FIG. 4A. As a result, "HT-STF1" to "HT-STF4" are generated. The same applies to "HT-LTF" as well. Furthermore, CDD is performed for each of the first to fourth streams by their respective timing shift amounts of "0 ns", "−50 ns", "−100 ns" and "−150 ns". Note that the absolute value of timing shift amount in the second CDD is so set as to be smaller than the absolute value of timing shift amount in the first CDD for HT-STF and HT-LTF. A similar processing is performed for "HT-LTF", "DATA 1" and the like assigned to the third stream and the fourth stream. A similar processing is performed for FIG. 4B, and thus a packet signal using the first to fourth streams is generated.

Figure 6:
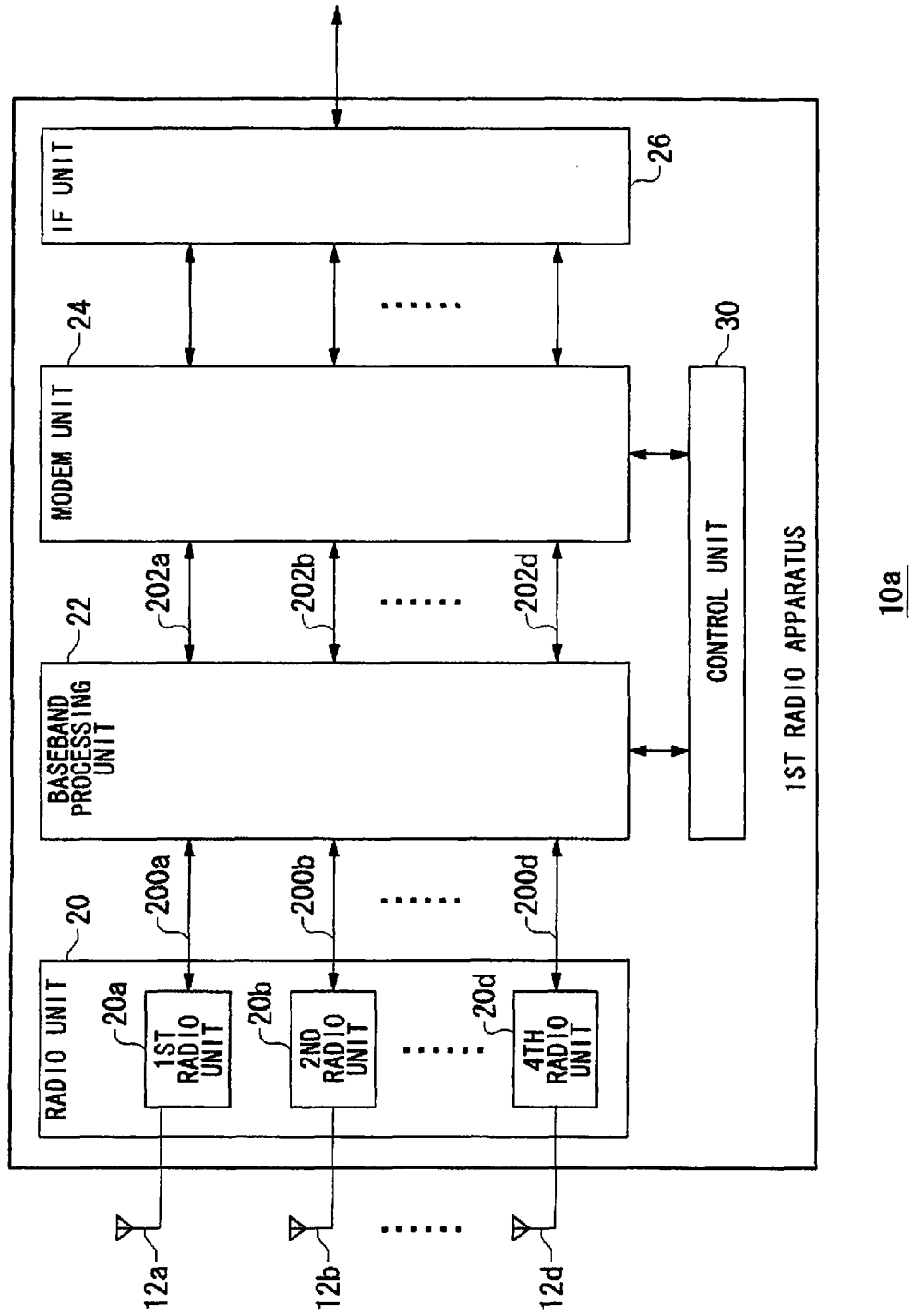
FIG. 6 illustrates a structure of a first radio apparatus shown in FIG. 2.

FIG. 6 illustrates a structure of a first radio apparatus 10a. The first radio apparatus 10a includes a first radio unit 20a, a second radio unit 20b, . . . and a fourth radio unit 24d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. Accordingly, in the following description, the description on the receiving operation corresponds to the processing by the second radio apparatus 10b, whereas the description on the transmission operation corresponds to the processing by the first radio apparatus 10a. This correspondence may be reversed, too.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 7:
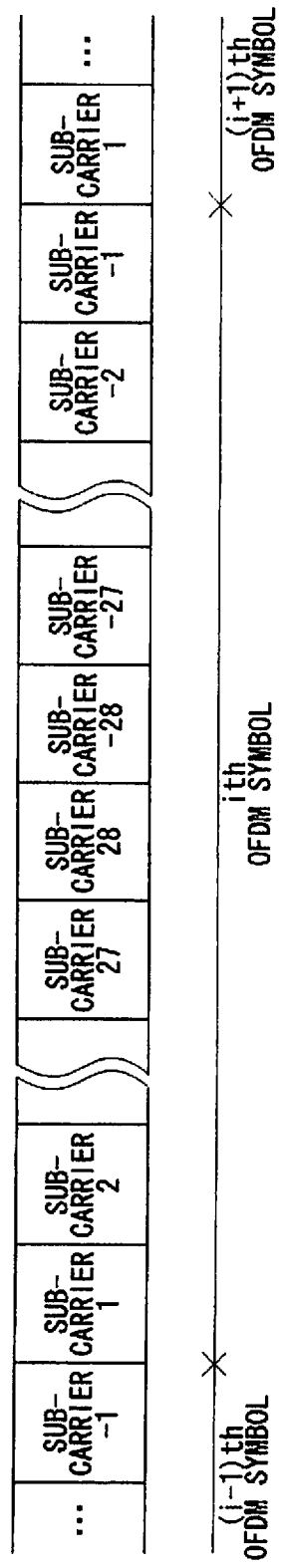
FIG. 7 illustrates a structure of a frequency-domain signal shown in FIG. 6.

FIG. 7 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like shown in FIG. 3A or the like, a combination of "−26" to "26" is used for one "OFDM symbol".

Now refer back to FIG. 6. To produce the packet formats corresponding to FIGS. 3A and 3B and FIGS. 4A and 4B, the baseband processing unit 22 carries out CDD. The baseband processing unit 22 performs the multiplication of a steering matrix to achieve the deformed or modified packet format as shown in FIG. 5. Such processing will be discussed later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. Here, an example of the coding is convolutional coding, whereas an example of decoding is Viterbi decoding.

The control unit 30 controls the timing and the like of the first radio apparatus 10a. The control unit 30 produces packet signals structured by a plurality of streams as shown in FIGS. 3A and 3B, FIGS. 4A and 4B and FIG. 5 in cooperation with the IF unit 26, the modem unit 24 and the baseband processing unit 22. Though the description of the processing for producing the packet signals shown in FIGS. 3A and 3B is omitted here, it is preferred that the relevant part of the processing corresponding to that for producing the packet signals shown in FIGS. 4A and 4B and FIG. 5 be executed.

For the baseband processing unit 22, the control unit 30 assigns Data to at least one of a plurality of streams, and assigns HT-LTF to a position anterior to Data in a stream where said Data is assigned. This corresponds to the arrangement in the first stream and second stream shown in FIG. 4A. For streams where said Data is not assigned, the control unit 30 assigns HT-LTFs to the timings other than those at which HT-LTF is assigned and Data is assigned. This corresponds to the arrangement in the third stream and fourth stream shown in FIG. 4A. As a result of the above, the baseband processing unit 22 produces the packet signals of the packet format shown in FIG. 4A.

For the baseband processing unit 22, the control unit 30 applies CDD to HT-LTF and the like assigned to a stream where Data is assigned. CDD corresponds to a processing where HT-LTF assigned to one of streams is used as a reference and a cyclic timing shift within HT-LFT is applied to HT-LTFs assigned to the other streams. The control unit 30 applies CDD also to HT-LTFs assigned to streams where no Data is assigned. The control unit 30 sets up beforehand the degrees of priority for the amounts of timing shift. Here, as described earlier, "0 ns" has the highest degree of priority, and following this the degrees of priority for the amounts of timing shift are defined in the descending order of "−400 ns", "−200 ns" and "−600 ns".

Furthermore, the control unit 30 has the baseband processing unit 22 use the timing shift amounts in the descending order of degrees of priority for the streams where Data are assigned. For example, "0 ns" is used for the first stream and "−400 ns" for the second stream in the case of FIG. 4A. Also, the control unit 30 has the baseband processing unit 22 use the timing shift amounts in the descending order of degrees of priority for the streams where no Data is assigned. For example, "0 ns" is used for the third stream and "−400 ns" for the fourth stream in the case of FIG. 4A. The control unit 30 has the baseband processing unit 22 apply CDD to Data also, and has it use the timing shift amount for the streams where Data are assigned, as the amount of timing shift.

With the above-described processing, after producing the packet signals of the packet format as shown in FIGS. 4A and 4B, the control unit 30 has the baseband processing unit 22 modify or deform such packet signals as these and transmit the modified packet signals to the radio unit 20. That is, the control unit 30 modifies or deforms the packet format as shown in FIG. 4A to the packet format as shown in FIG. 5. After extending the number of streams where Data are assigned to the number of multiple streams, the baseband processing unit 22 applies CDD to the thus extended streams. After extending the number of streams where no Data is assigned to the number of multiple streams, the baseband processing unit 22 applies CDD to the thus extended streams. Here, the amount of timing shift is set by the control unit 30 in a manner that the values of timing shift amounts for the streams where Data are assigned are equal to the values of timing shift amounts for the streams where no Data is assigned.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 8:
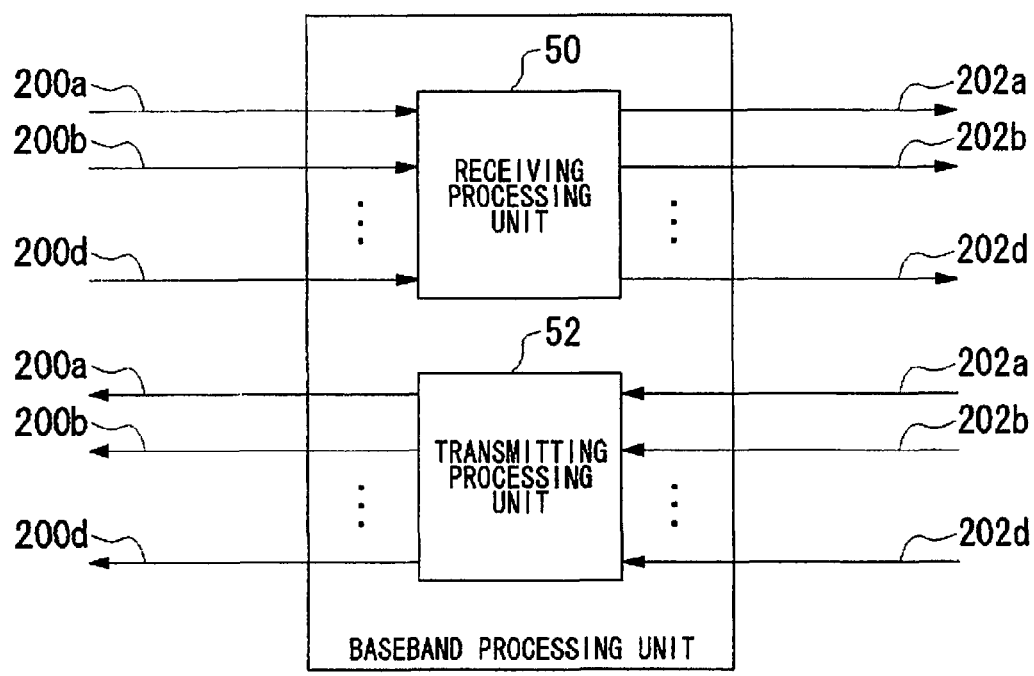
FIG. 8 illustrates a structure of a baseband processing unit shown in FIG. 6.

FIG. 8 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202. It is to be noted here that the receiving processing unit 50 may generate rate information based on the frequency-domain signals 202. As for the generation of rate information, a known technique serves the purpose as mentioned above and the explanation thereof is omitted here.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting processing unit 52 associates a plurality of streams with a plurality of antennas 12, respectively. The transmitting processing unit 52 applies CDD as shown in FIGS. 4A and 4B. The transmitting processing unit 52 may execute an operation using a steering matrix. The transmitting processing unit 52 outputs finally the time-domain signals 200. On the other hand, the transmitting processing unit 52 may execute beamforming when transmitting the packet signals as shown in FIGS. 3A and 3B. As for the beamforming, a known technique serves the purpose as mentioned above and the explanation thereof is omitted here.

Figure 9:
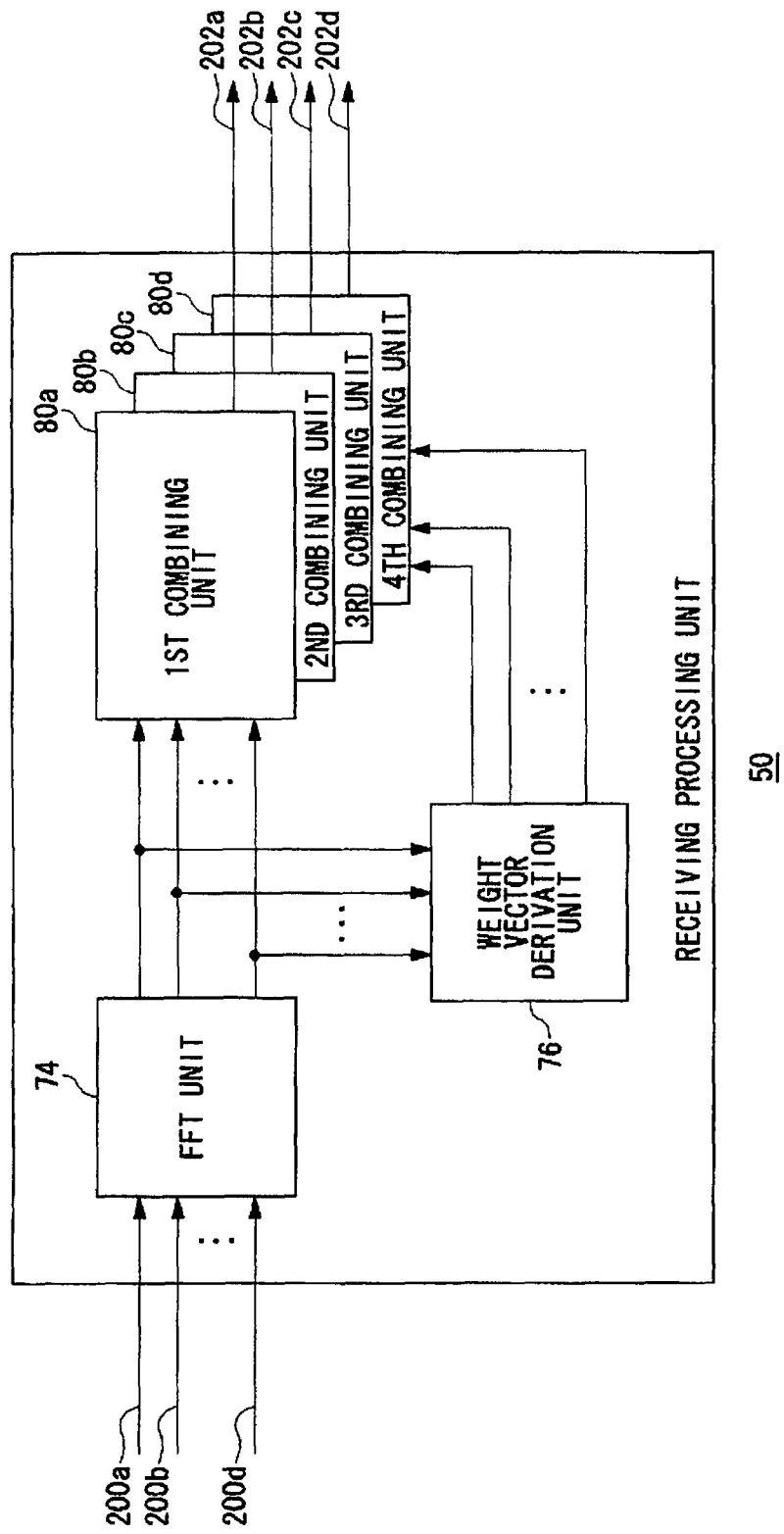
FIG. 9 illustrates a structure of a receiving processing unit shown in FIG. 8.

FIG. 9 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 7. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used in deriving a weight vector corresponding to each of a plurality of streams. To derive the weight vector, an adaptive algorithm may be used or channel characteristics may be used. Since a known technique may be employed in the processing for the adaptive algorithm and so forth, the explanation thereof is omitted here. When deriving the weight vector, the weight vector derivation unit 76 executes an operation of the first component minus (−) the second component plus (+) the third component minus (−) the fourth component or the like, as described earlier. As also described above, the weights are derived finally for each of subcarriers, antennas 12 and streams, respectively.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 10:
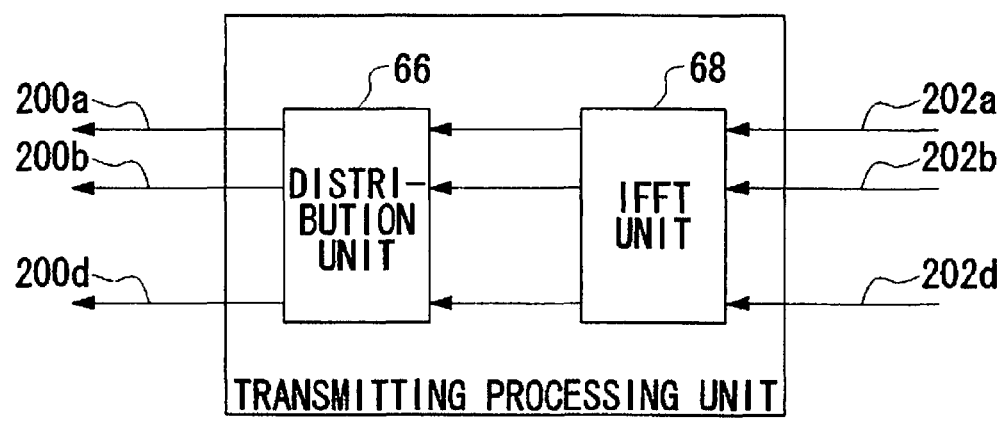
FIG. 10 illustrates a structure of a transmitting processing unit shown in FIG. 8.

FIG. 10 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. To produce the packet signals corresponding to FIGS. 3A and 3B and FIGS. 4A and 4B, the distribution unit 66 carries out CDD. CDD is expressed as a matrix C in the following Equation (1).

$$C(l) = \text{diag}(1, \exp(-j2\pi l \delta/N\text{out}), \ldots, \exp(-j2\pi l \delta(N\text{out}-1)/N\text{out})) \quad (1)$$

where δ indicates a shift amount and l a subcarrier number. The multiplication of the matrix C by a stream is done on a subcarrier-by-subcarrier basis. That is, the distribution unit 66 carries out a cyclic time shifting within the L-STF and so forth per stream. The amount of timing shift is so set, by following the above-described degree of priority, as to correspond to FIGS. 3A and 3B and FIGS. 4A and 4B.

The distribution unit 66 may multiply respectively the training signals produced, as in FIGS. 4A and 4B, by a steering matrix so as to increase the number of streams for training signal up to the number of a plurality of streams. Before carrying out multiplication, the distribution unit 66 extends the degree of inputted signals to the number of a plurality of streams. In the case of FIG. 4A, the number of signals inputted is "2" in "HT-STF" and the like assigned to the first and the second stream, and this will be represented by "Nin" here. Accordingly, the inputted data are indicated by a vector of "Nin×1". The number of a plurality of streams is "4" and this is represented by "Nout" here. The distribution unit 66 extends the degree of inputted data to Nout from Nin. In other words, the vector of "Nin×1" is extended to the vector of "Nout×1". In so doing, "0" is inserted to components from the (Nin+1)th row to the Nout-th row. On the other hand, the component up to Nin are "0's" for "HT-LTF" assigned to the third and the fourth stream of FIG. 4A, and HT-LTF (−200 ns) and the like are inserted to the components from (Nin+1)th row to the Nout-th row A steering matrix is expressed by the following Equation (2).

$$S(l) = C(l)W \quad (2)$$

The steering matrix is a matrix of "Nout×Nout". W is an orthogonal matrix of "Nout×Nout". An example of the orthogonal matrices is a Walsh Matrix. Here, l is the subcarrier number, and the multiplication by a steering matrix is done on a subcarrier-by-subcarrier basis. C denotes CDD as described above. Here, the amounts of timing shift are so defined as to differ for a plurality of streams, respectively. That is, the amounts of timing shift for the first to the fourth stream are defined to be, for example, "0 ns", "−50 ns" "−100 ns" and "−150 ns", respectively.

Here a description will be made of modifications to the present embodiments. In the embodiments so far described, a control unit 30, when having a baseband processing unit 22 perform CDD, uses timing shift amounts in the descending order of predetermined degrees of priority given thereto. In the modifications, however, the control unit 30 defines timing shift amounts of different values for a plurality of streams, respectively.

Figure 11A:
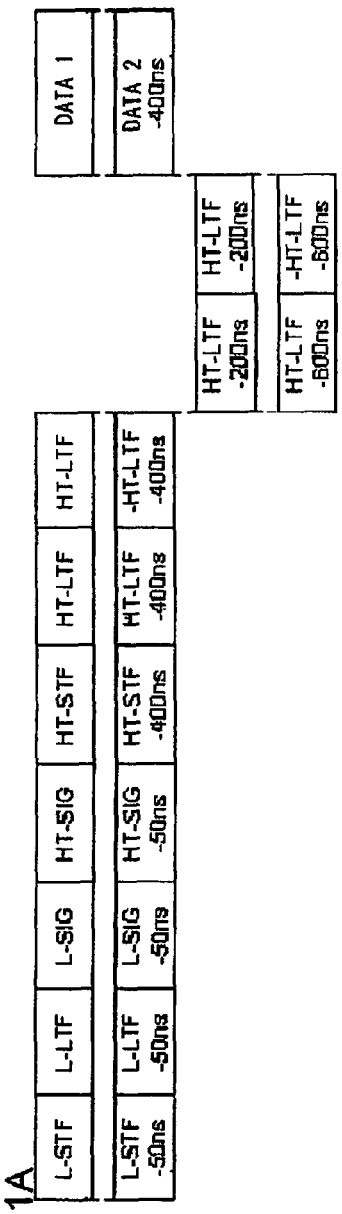
FIGS. 11A to 11C illustrate other types of different packet formats for training signals in a communication system shown in FIG. 2.
Figure 11B:
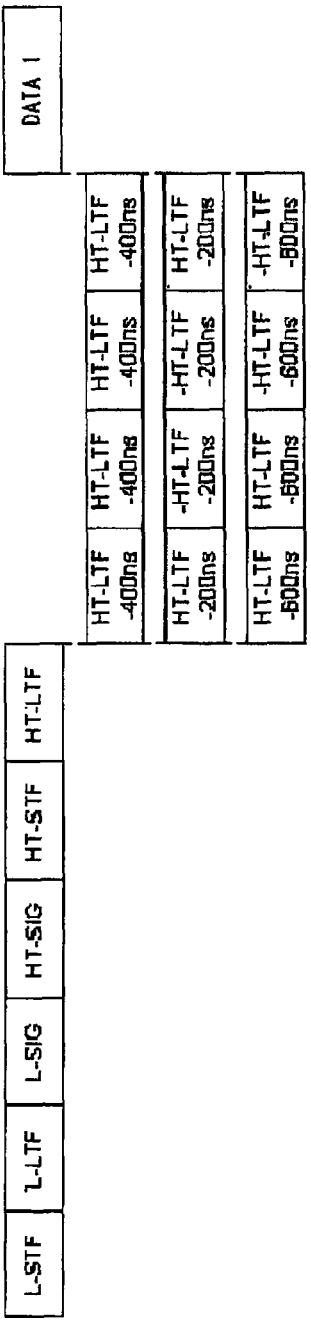

FIGS. 11A and 11B show another different packet formats for use with training signals in a communication system 100. FIGS. 11A and 11B correspond to FIGS. 4A and 4B, respectively. Here the control unit 30 defines a timing shift amount of "0 ns" for the first stream, a timing shift amount of "−400 ns" for the second stream, a timing shift amount of "−200 ns" for the third stream, and a timing shift amount of "−600 ns" for the fourth stream. As a result, in FIG. 11A, the timing shift amounts of "−200 ns" and "−600 ns" are used for the third and the fourth stream, respectively, instead of "0 ns" and "−400 ns" of FIG. 4A. On the other hand, in FIG. 11B, the timing shift amounts of "−400 ns", "−200 ns" and "−600 ns" are used for the second to the fourth stream, respectively, instead of "0 ns", "−400 ns" and "−200 ns" of FIG. 4B.

Figure 11C:
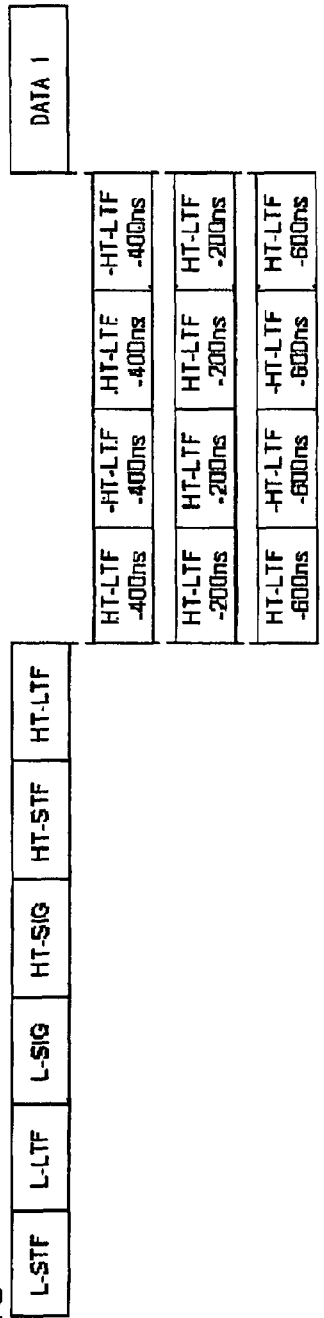

The packet formats of FIG. 11C are structured the same way as for those of FIG. 11B. However, the combination of the signs of "HT-LTF" in FIG. 11C differs from that in FIG. 4B. Here the combinations of the signs of "HT-LTF" are given degrees of priority beforehand. That is, the degrees of priority are so defined that the combination of signs in the first stream of FIG. 3A has the highest degree of priority and that in the fourth stream thereof the lowest. Also, for streams to which a data signal is assigned, the combinations of signs are used in order from one with the highest degree of priority, and also for streams to which a data signal is not assigned, the combinations of signs are used in order from one with the highest degree of priority. If the combinations of signs are the same in a manner as described above, a common circuit can be used in both of the calculation of channel characteristics for the part of "HT-LTF" in streams to which data is not assigned and the calculation of channel characteristics for the part of "HT-LTF" in streams to which data is assigned when the receiving apparatus takes out the respective components by performing + (plus) and − (minus) operations.

According to an embodiment of the present invention, the number of streams to which HT-STF is assigned is the same as the number of streams to which data is assigned when generating a training signal. Hence, the gain set by HT-STF is in correspondence to data, thus preventing the worsening of data receiving characteristics. In generating a training signal, the timing of HT-LTF assigned to a stream to which data is assigned is shifted from the timing of HT-LTF assigned to a stream to which data is not assigned so as to get the received powers of both the streams closer to each other. As a result of this getting the received powers of both the streams closer to each other, even when HT-STF is not assigned to the stream where data is not assigned, it is possible to prevent any worsening of estimation of channel characteristics by said stream.

More of the same timing shift amounts can be used by defining the degrees of priority for the timing shift amounts and using the timing shift amounts in order from one with the highest degree of priority for both the stream where data is assigned and the stream where data is not assigned. Moreover, the processing may be made simpler by using more of the same timing shift amounts. Further, when the number of a plurality of streams is "2" and the number of streams to which data is assigned is "1", a receiving apparatus may instruct a transmitting apparatus which of the plurality of streams is to have data assigned, according to the receiving condition of HT-LTF. In other words, it is possible to execute transmission diversity.

Since the timing shift amounts for the respective HT-LTFs assigned to a plurality of streams are of the same values, a receiving apparatus can cope easily when there are changes in streams that have data assigned. Since different timing shift amounts are set for a plurality of streams, respectively, the processing can be carried out uniformly. Moreover, such a uniformly performed processing makes the processing simpler. Even when the number of streams where data is assigned increases in the subsequent packet signal, the HT-LTF for the stream to have the increase thereof has already been transmitted with the same timing shift amount, so that the receiving apparatus can use the already derived timing and the like. Since it can use the already derived timing and the like, the receiving apparatus can easily cope with the increase in the number of streams where data is assigned.

The present invention has been described based on the embodiments. These embodiments are merely exemplary, and it is understood by those skilled in the art that various modifications to the combination of each component and process thereof are possible and that such modifications are also within the scope of the present invention.

According to the embodiments of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus for receiving a packet signal composed of a plurality of streams in a Multiple-Input Multiple-Output (MIMO) system, the radio apparatus comprising:

a radio unit which receives the packet signal in which a data signal is assigned to at least one of the plurality of streams in the MIMO system, a first known signal for channel estimation is assigned anterior to a data signal in a stream to which said data signal is assigned, and a second known signal for channel estimation is assigned to a timing other than a timing at which a first known signal is assigned and a timing at which a data signal is assigned, for a stream in which said data signal is not assigned; and a baseband processing unit which processes the packet signal received by said radio unit, wherein using as a reference a first known signal assigned to one of the streams where a data signal is assigned, a cyclic timing shift within a first known signal is applied to a first known signal assigned to the other streams, and a timing shift is applied to the second known signal assigned to a stream where data is not assigned.

2. A radio apparatus according to claim 1, wherein an amount of timing shift is given before a degree of priority, and for the stream where a data signal is assigned, the amount of timing shift is used sequentially in order from one with the highest degree of priority, whereas for the stream where a data signal is not assigned, the amount of timing shift is used sequentially in order from one with the highest degree of priority.

3. A radio apparatus according to claim 1, wherein the first known signal and the second known signal are formed by repeating a predetermined signal unit in time domain, a combination of signs in a predetermined signal unit is defined in a manner such that an orthogonal relationship holds among streams, and the combination of signs in a predetermined signal unit for each of a plurality of streams is fixed, wherein the predetermined signal unit is the unit of one signal composed of a plurality of subcarriers.

4. A radio apparatus according to claim 1, wherein the first known signal and the second known signal are formed by repeating a predetermined signal unit in time domain, a combination of signs in a predetermined signal unit is defined in a manner such that an orthogonal relationship holds among streams, and the combination of signs in a predetermined signal unit is given before a degree of priority, and wherein for the stream where a data signal is assigned, the combination of signs is used sequentially in order from one with the highest degree of priority, whereas for the stream where a data signal is not assigned, the combination of signs is used sequentially in order from one with the highest degree of priority.

5. A radio apparatus according to claim 1, wherein the cyclic timing shift to a data signal is applied and an amount of timing shift for the stream where a data signal is assigned is used as the amount of timing shift.

\* \* \* \* \*